US010906256B2

(12) United States Patent
Kolandaivelu

(10) Patent No.: US 10,906,256 B2
(45) Date of Patent: Feb. 2, 2021

(54) METHODS FOR FABRICATING LOW COST 3-D PRINTED PARTS WITH EXPANDED MATERIAL PROPERTIES

(71) Applicant: MASSACHUSETTS INSTITUTE OF TECHNOLOGY, Cambridge, MA (US)

(72) Inventor: Kumaran Kolandaivelu, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 327 days.

(21) Appl. No.: 15/578,336

(22) PCT Filed: Jun. 6, 2016

(86) PCT No.: PCT/US2016/036011
§ 371 (c)(1),
(2) Date: Nov. 30, 2017

(87) PCT Pub. No.: WO2016/197099
PCT Pub. Date: Dec. 8, 2016

(65) Prior Publication Data
US 2018/0147798 A1 May 31, 2018

Related U.S. Application Data

(60) Provisional application No. 62/170,750, filed on Jun. 4, 2015.

(51) Int. Cl.
*B29C 70/60* (2006.01)
*B33Y 80/00* (2015.01)
(Continued)

(52) U.S. Cl.
CPC ............ *B29C 70/60* (2013.01); *B29C 64/124* (2017.08); *B29C 64/245* (2017.08);
(Continued)

(58) Field of Classification Search
CPC .......... B29C 64/124–135; B33Y 10/00; B33Y 30/00
See application file for complete search history.

(56) References Cited

U.S. PATENT DOCUMENTS

| | | | |
|---|---|---|---|
| 4,212,621 A * | 7/1980 | Michelotti | .......... B29C 33/0011 425/405.2 |
| 8,506,862 B2 | 8/2013 | Giller et al. | |
| 2015/0108677 A1* | 4/2015 | Mark | ...................... B29C 70/20 264/138 |

FOREIGN PATENT DOCUMENTS

WO 2015120429 8/2015

OTHER PUBLICATIONS

International Preliminary Report on Patentability issued in related PCT Application No. PCT/US2016/036011 dated Dec. 14, 2017.
(Continued)

*Primary Examiner* — Matthew J Daniels
*Assistant Examiner* — Andrew L Swanson
(74) *Attorney, Agent, or Firm* — Gesmer Updegrove LLP

(57) ABSTRACT

A 3-D (three dimensional) printing system is provided that includes a customized matrix having suitable material properties and geometric patterning to facilitate filling and retention of one or more filler material. The customized matrix defines the geometry and shape of the object. A filler mechanism that fills the customized matrix with one or more filler materials. The one or more filler materials retained within the customized matrix are cured or solidified to produce the object.

13 Claims, 14 Drawing Sheets

(51) Int. Cl.
*B29C 69/00* (2006.01)
*B29C 64/124* (2017.01)
*B29C 64/245* (2017.01)
*B29C 64/295* (2017.01)
*B29C 70/64* (2006.01)
*B33Y 10/00* (2015.01)
*B29K 105/12* (2006.01)

(52) U.S. Cl.
CPC ............ *B29C 64/295* (2017.08); *B29C 69/00* (2013.01); *B29C 70/64* (2013.01); *B33Y 80/00* (2014.12); *B29K 2105/124* (2013.01); *B33Y 10/00* (2014.12)

(56) References Cited

OTHER PUBLICATIONS

International Search Report and Written Opinion issued in related PCT Application No. PCT/US2016/036011 dated Aug. 26, 2016.

\* cited by examiner

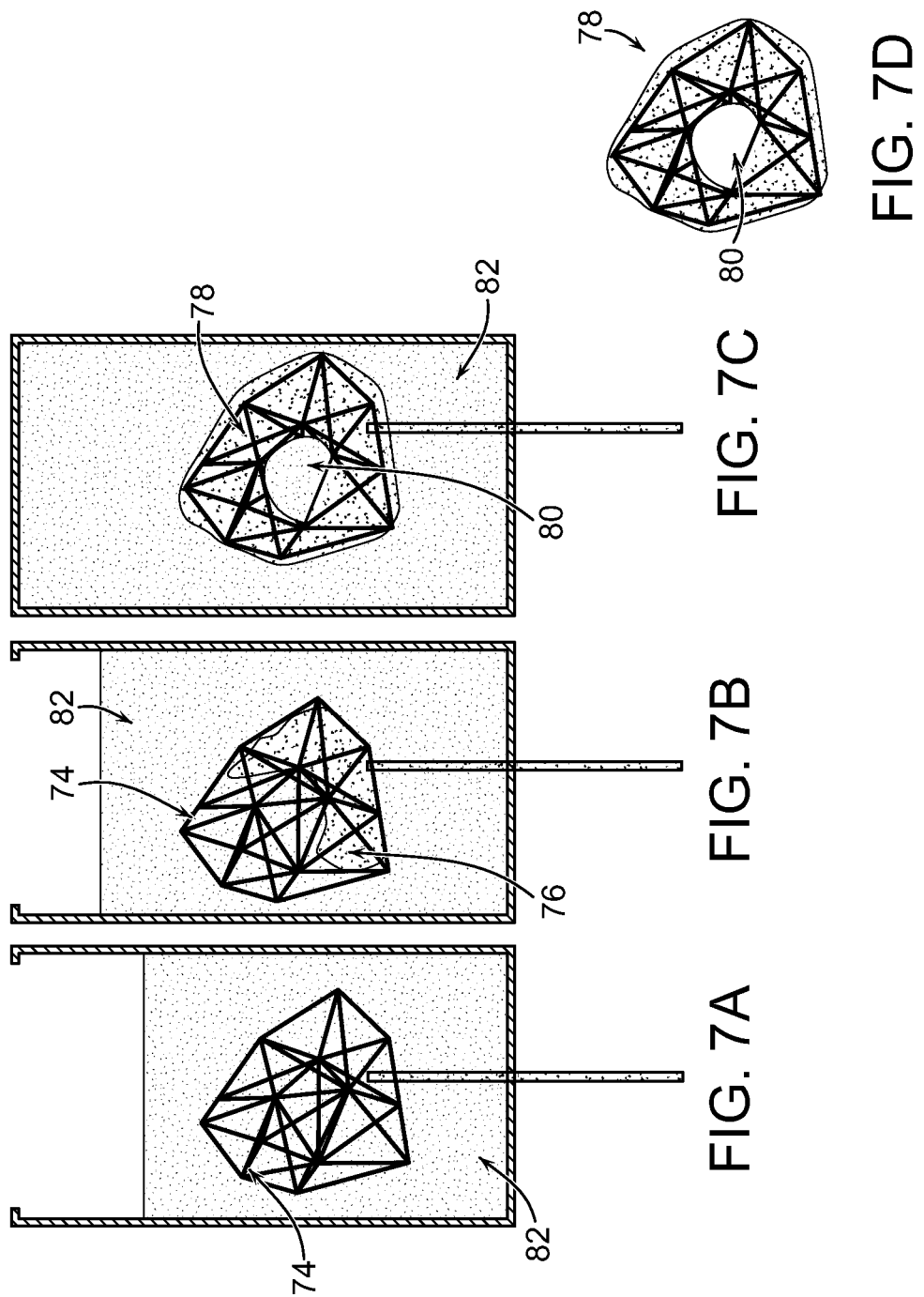

METHODS FOR FABRICATING LOW COST 3-D PRINTED PARTS WITH EXPANDED MATERIAL PROPERTIES

PRIORITY INFORMATION

This application is a U.S. National Phase application which claims priority from PCT application Ser. No. PCT/US2016/36011 filed Jun. 6, 2016 which claims priority from U.S. provisional application Ser. No. 62/170,750 filed Jun. 4, 2015, both of which is are incorporated herein by reference in its their entirety.

BACKGROUND OF THE INVENTION

The invention is related to the field of 3-D (three dimensional) or adhesive printing and in particular to fabricating 3-D parts with expanded material properties.

Generally, there exists a need for making customizable parts. One example is via 3-D printing, which is a rapidly growing fabrication method to readily create structures across a range of applications (healthcare, defense, dental, aerospace, automotive, architecture, research/education, industrial design, entertainment/social/personal, etc. etc.). The process has the advantage that parts can be designed and fabricated readily, making it particularly suitable for prototyping or emerging personalized use cases (i.e. medical implants). Yet to date, real limitations exist. These include limited material selection, anisotropic material properties if parts are constructed as layers, cost/availability of material, part resolution, and production time. These limitations have restricted use of 3-D printing in larger scale manufacturing processes, or in material-demanding scenarios such as meeting broad biomedical or aerospace applications needs.

Another technique in which customized parts are readily made is through the assembly of smaller, standardized elements (or sub-assemblies) into larger desired

SUMMARY OF THE INVENTION

According to one aspect of the invention, there is provided A 3-D printing system that forms an object. The 3-D printing system includes a customized matrix having suitable material properties and geometric patterning to facilitate filling and retention of one or more filler material. The customized matrix defines the geometry and shape of the object. A filler mechanism that fills the customized matrix with one or more filler materials. The one or more filler materials retained within the customized matrix are cured or solidified to produce the object.

According to another aspect of the invention, there is provided a method of forming an object using a 3-D printing system. The method includes providing a customized matrix that includes suitable material properties and geometric patterning to facilitate filling and retention of one or more filler materials. The customized matrix defines the geometry and shape of the object. Also, the method includes filling the customized matrix with the one or more filler materials. The one or more filler materials retained within the customized matrix are cured or solidified to produce the object.

According to another aspect of the invention, there is provided a customized matrix for use in a 3-D printing system that forms an object. The customized matrix includes suitable material properties and geometric patterning to facilitate filling and retention of one or more filler materials. The customized matrix defines the geometry and shape of the object. The customized matrix configured to be filled with and retain the one or more filler materials. The one or more filler materials retained within the customized matrix are cured or solidified to produce the object.

BRIEF DESCRIPTION OF THE DRAWINGS

FIGS. 7A-7D are schematic diagrams illustrating the process of filling during submersion of a customized part having a cavity, hole, channel, or void;

DETAILED DESCRIPTION OF THE INVENTION

Figure 1A:
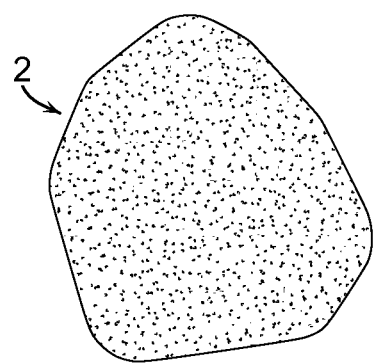
FIGS. 1A-1D are schematic diagrams illustrating how a customized part is formed in accordance with the invention.

The invention encompasses a sequential method whereby 1) a matrix/designed lattice construct of a desired object, or portion thereof, is first produced and 2) then filled with a curing casting material (or liquid filler material) with desirable material properties. The matrix is designed as a minimal structure of specific lattice element/strut design to be able to hold/constrain the casting material and define its 3-D geometry, while the casting material is selected for ability to fill and be retained in the 3-D construct while imparting final part properties after cure (i.e., flexibility, rigidity, strength, temperature stability, biocompatibility, modulus, tear strength, etc.).

It should be noted that the gaps in the matrix are not a natural, bulk property of the casting material (i.e., material porosity upon curing, cooling, sintering, melting, bonding, hardening in some manner), but rather arises as a secondary structure from matrix elements/strut design incorporated into the object design. While one can define the former material pores to be a primary structure, the inventive lattice is at the level of secondary structure.

The matrix can be produced by 3-D printing or by assembly of premade geometric forms into a final matrix.

The filling is accomplished by injection/feeding the casting material (i.e. such as a curable agent, a thermoplastic, resin, epoxy, multi-part reaction polymer, photopolymer, or others) into the 3-D construct until the construct has been filled to a desirable level (generally, though not limited to exactly filled or slightly overfilled such that the casting material coats the outside of the 3-D construct). The meshed construct geometry may have a specialized mesh (or continuous) design at the edges/desired surfaces to impart final surface properties with a desired resolution/accuracy.

The 3-D construct contains volumes/internal channels that are highly interconnected, though aspects of the overall part can be partitioned such that some aspects of the part are isolated and require filling via different injections, or left unfilled all together. The matrix can have channels or 'cutout/circumscribed volumes/voids' that allow non-solid (i.e. hollow) parts to be made with internal chambers/holes/voids/channels, thus forming a tertiary structure. In other words, the bulk porosity can be considered a primary structure (not the novelty of the design), designed elements to be filled with curable agent a secondary structure, and patterning of secondary structures to leave complex shapes, such as voids or chambers, the tertiary structure of the final object design.

Generally, the casting material is held in place during the curing process by surface interactions or reactions with the 3-D construct and/or interactions with the surrounding environment in which the part is left to cure during or after filling. In some preferred methods, the casting material is held in the 3-D construct via surface tension. In other preferred methods, the casting material is held in place by forces such as hydrophilic/hydrophobic/electrostatic interactions with the 3-D construct.

In other preferred embodiments, the casting material is bonded/linked in place by chemical interactions between the casting material and the 3-D construct surface, such as covalent bonding, while internal forces within the casting material help hold it together, potentially also in the context of external forces, such as with submersion in a submersion fluid (as described below). In yet other embodiments, the interaction between the 3-D construct and the casting material is absorption of a portion of the casting material into the 3-D construct elements, where again, internal forces within the casting material help hold it together.

In some cases, both the matrix structure and filler may be of the same material such as a photopolymer or curable resin.

Figure 1B:
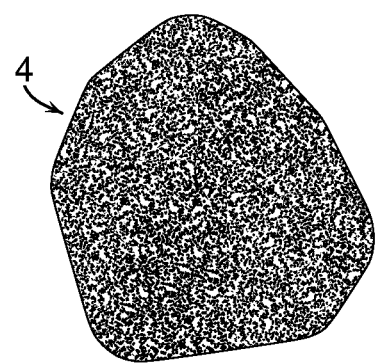
Figure 1C:
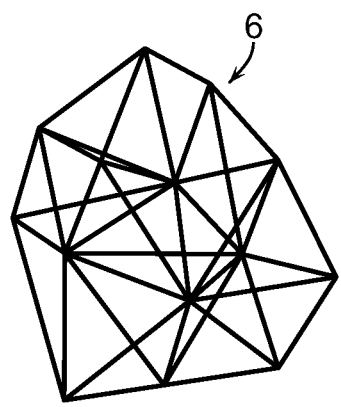
Figure 1D:
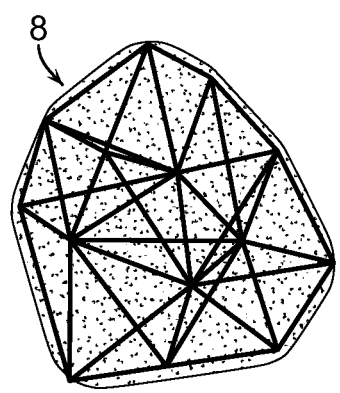

FIGS. 1A-1D show a customized part formed in accordance with the invention. FIG. 1A shows a customized part geometry 2 fabricated in a desired material. FIG. 1B shows a part geometry 4 fabricated in undesirable material as constrained by a process such as 3-D printing or through assembly of standardized parts made of undesirable materials (i.e. non-biocompatible, too soft, too fragile, too rigid, poor conductivity, poor thermal properties, expensive, or the like). FIG. 1C shows a 3-D construct 6 that defines geometric shape where volume of the material comprising elements of the construct is the volume of material comprising the final desired part. FIG. 1D shows sequentially fabricated part 8 after the 3-D construct 6 has been filled with desirable casting material. The 3-D construct 6, casting material, and process have been designed to support desirable filling as described herein.

It should be noted that one or more casting (or liquid filler) materials may be used to fill aspects/portions of the 3-D construct to impart specific material properties to the final part, thereby forming filler composites or mosaics of materials. For example, this may be a rubber shell around a rigid core, or it may be a multi-colored mosaic part, or other mosaic/composite parts. Also, by constructing specific elements of the 3-D construct with specific cohesive properties with desired liquid fillers, certain aspects of the 3-D construct may be made more amenable to filling and retention of certain desired liquid fillers.

Figure 2A:
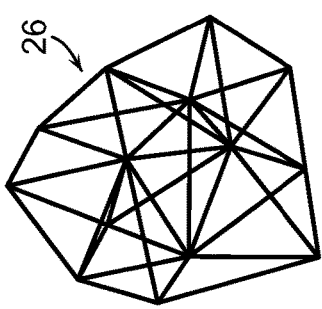
FIG. 2A-2E are schematic diagrams illustrating a first technique in filling a 3-D construct to form a customized part.
Figure 2B:
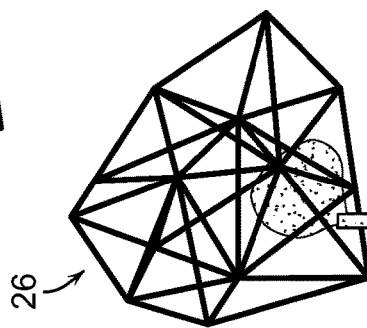
Figure 2C:
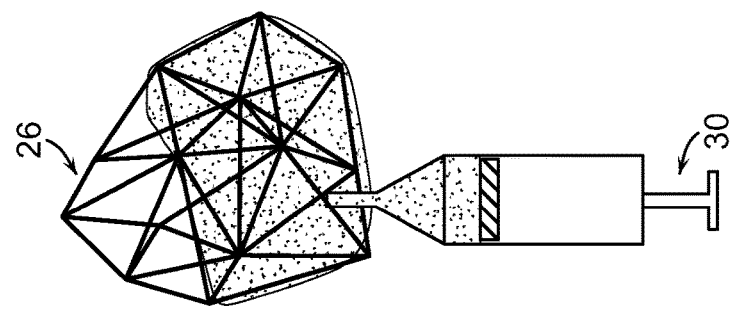
Figure 2D:
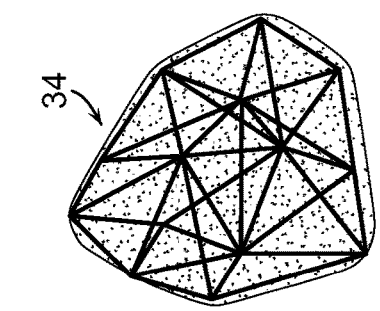
Figure 2E:
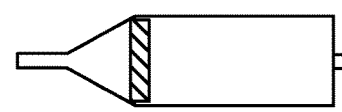

FIG. 2A-2E illustrates a first technique in filling a 3-D construct to form a customized part. FIG. 2A shows a sparse, geometry defining a 3-D construct 26 used to form a customized part. FIGS. 2B-2D shows feeding desired casting material 28 into a 3-D construct 26 through some feeding mechanism 30, such as injection. The casting material 28 and construct 26 are tuned to have specific properties, such as surface tension properties, hydrophilicity/hydrophobicity, electrostatic forces, viscosity, densities, to support filling and retention of casting material in the construct 26. After filling, the part 32 is removed and allowed to cure, as shown in FIG. 2E. Such curing can occur in a gas such as air or nitrogen, or in a submersion fluid.

Filling may occur in a portion of the matrix, cure or solidified, then done in another portion of the matrix with the same or different filler material. In some cases, a lubricant such as a mold release agent can be used in between filling steps such that separate components of the mosaic/composite are not bonded together. In other cases, an adhesive or adhesive promoting agent can be used to promote adhesion between sequentially added neighboring fillers to promote bonding.

Figure 3A:
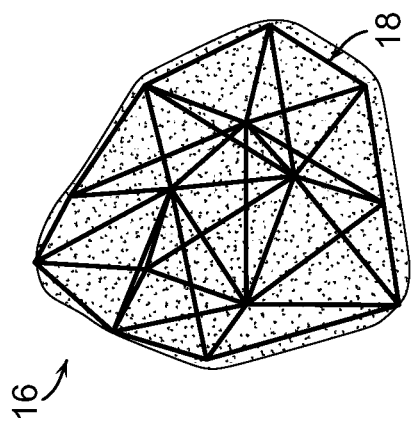
FIGS. 3A-3D are schematic diagrams illustrating an alternative technique in filling a 3-D construct to form a customized part.
Figure 3B:
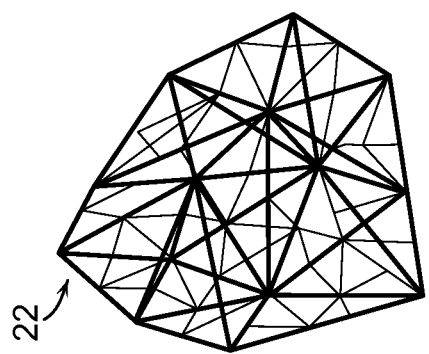
Figure 3C:
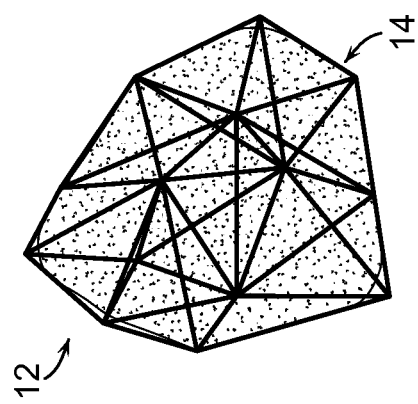
Figure 3D:
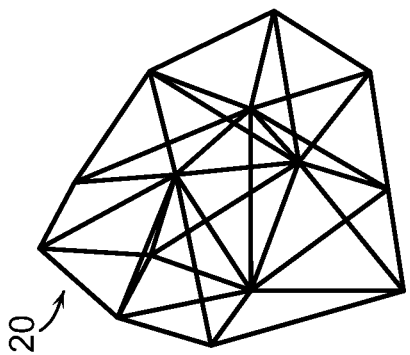

FIGS. 3A-3D illustrates an alternative technique in filling a 3-D construct to form a customized part. FIG. 3A shows a part 12 with slight underfilling so the 3-D construct 14 is just at the surface, protruding from the surface. FIG. 3B shows a part 16 with slight overfilling such that the casting material just surrounds the construct elements 18 to eliminate construct protrusion. FIG. 3C shows a 3-D construct 20 without special consideration for the surface meshwork. FIG. 3D shows a 3-D construct 22 with meshwork at the surface designed (i.e. finer elements) to promote retention of the casting material as by increasing surface tension forces and/or promote surface quality of a customized part.

Figure 4:
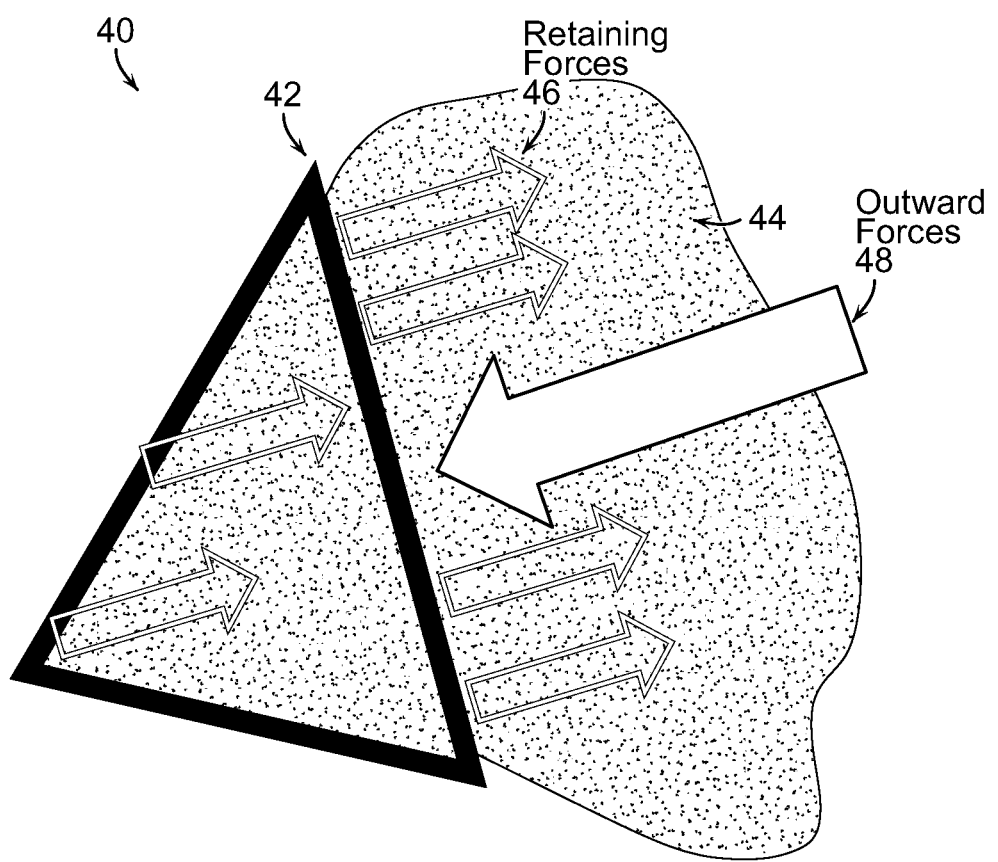
FIG. 4 is a schematic diagram illustrating a customized part having an element, pore, or opening and the resultant forces associated therewith.

FIG. 4 illustrates an example of an element, pore, or opening 40 at the surface where properties of the 3-D construct 42 and casting material 44 result in sufficient forces 46, such as surface tension forces or hydrophobic, hydrophilic, chemical, ionic, electrostatic, magnetic forces, or the like, that keep the casting material 44 retained in the 3-D construct 42 with a particular surface despite outward forces 48 such as filling forces, gravitational forces, acceleration forces, centrifugal forces, or the like.

Figure 5:
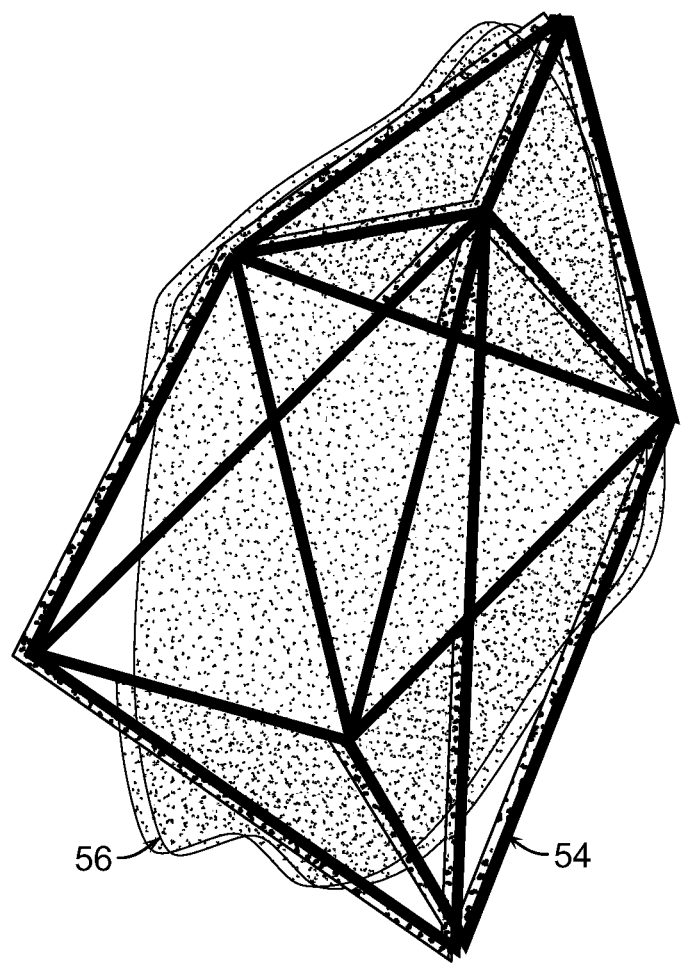
FIG. 5 is a schematic diagram illustrating the retaining forces of a 3-D construct.

FIG. 5 illustrates another example of a 3-D construct 54 (at surface or in the volume) where in forces between the 3-D construct elements and the casting material 56, such as hydrophobic, hydrophilic, chemical, ionic, electrostatic, magnetic, or the like, result in retention of the casting material 56 within the 3-D construct 54.

The casting material can be further constrained by forces external to the 3-D construct such as hydrophilic/hydrophobic interactions imparted by a surrounding submersion fluid. This part can be filled with filler material, and then subsequently submerged in the desirable fluid to impose desirable surrounding forces. In preferred embodiments, the 3-D construct can be submerged in a desirable fluid and then filled with the casting material in a manner such that the casting material replaces the submersion fluid until the 3-D construct is filled (or slightly over/desirably filled). In some cases where the construct is initially filled via submersion in a desirable fluid, internal chambers/voids/channels may exist in the part that are also filled with the desirable fluid and which remain filled as the casting material fills the rest of the 3-D construct.

Figures 6A, 6B, 6C:
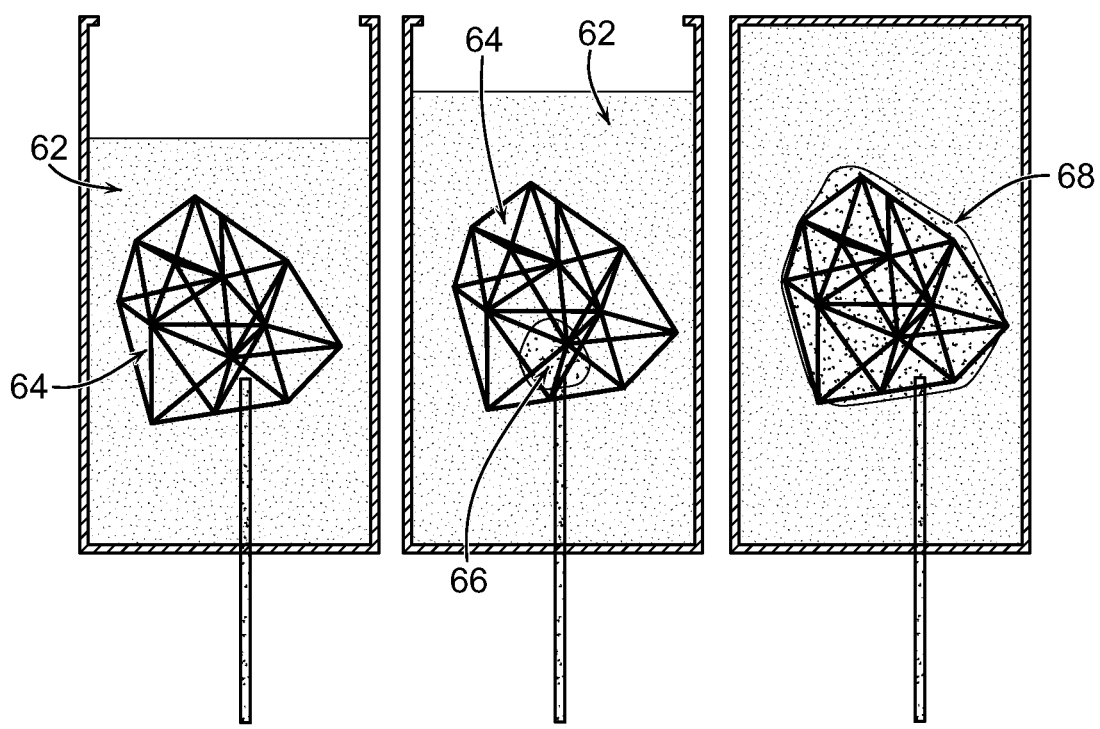
FIG. 6A-6C are schematic diagrams illustrating the process of filling during submersion.

FIGS. 6A-6C shows an example of filling during submersion in a specific submersion fluid. FIG. 6A shows a 3-D construct 64 being submersed while FIG. 6B shows a desired casting material 66 fed into the 3-D construct 64 until desirably filled. FIG. 6C shows the customized filled part 68. Submersion fluid 62 can have specific properties that assist in 3-D construct filling, retention of casting material, surface quality of casting material, specified density such as density matched to casting material, viscosity to limit convective disturbances during filling and/or curing, thermal properties to permit cooling/heating to control curing of casting material, transmission properties to permit radiative energy transfer to control curing, such as UV light curing, incompressible properties to facilitate hydraulic pressure application, or the like. Examples of properties that promote filling and retention are a 3-D construct and casting material which are hydrophobic with a submersion fluid that is hydrophilic (or vice versa).

FIGS. 7A-7D illustrates a customized part being made having cavities/holes/channels/voids 80 by controlling interactions of a 3-D construct 74 and casting material 76 and/or surrounding submersion substance 82. FIGS. 7A-7C shows filling of the 3-D construct 74 with desirable casting material 76 in a manner that leaves a cavity/hole/channel/void 80. FIG. 7D shows the customized part 78 after the submersion fluid 82 has been removed.

Figures 8A, 8B, 8C:
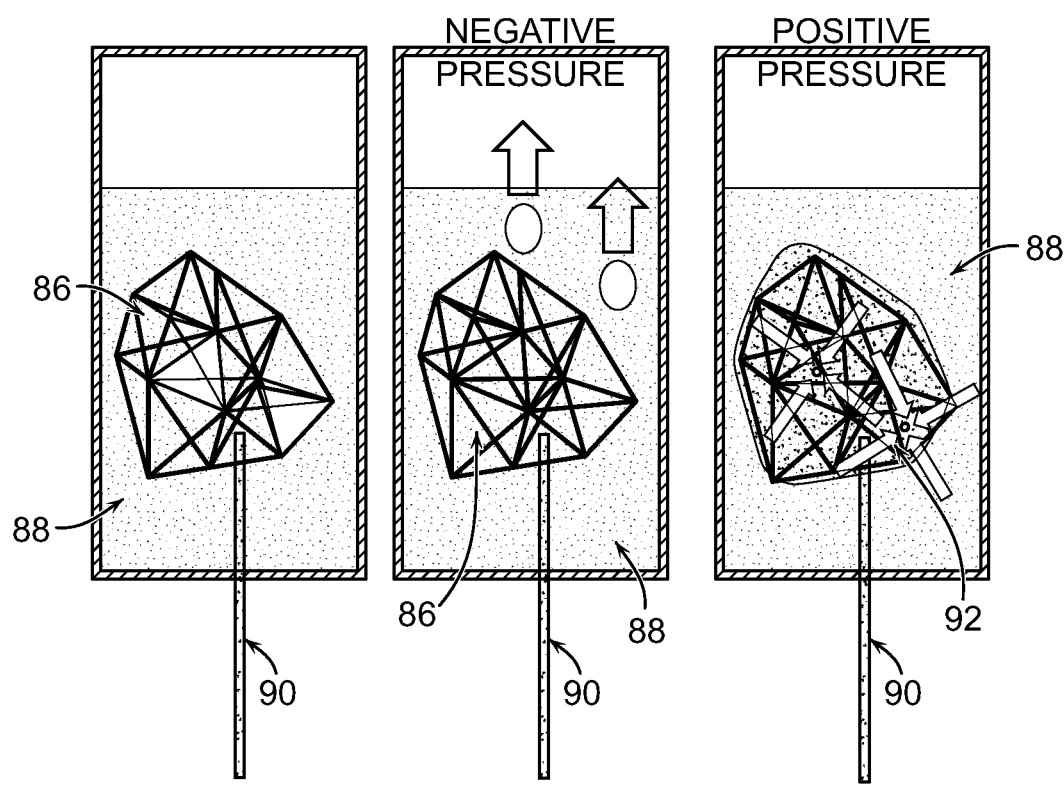
FIGS. 8A-8C are schematic diagrams illustrating the process of filling during submersion of a customized part using pressure.

FIGS. 8A-8C illustrate the use of vacuum/pressurized chambers can facilitate filling of the 3-D construct with submersion fluid and/or casting material by removing or compressing air in the 3-D construct. Depending on surface tension properties of 3-D construct, initial filling gas (such as air), and fluid (either casting material 90 or submersion fluid 88), trapped gas can occur in elements of the 3-D construct 86, as shown in FIG. 8A. FIG. 8B shows standard techniques such as low pressure/vacuum (negative pressure) can be used to reduce or eliminate trapped gas if desired.

Figure 9:
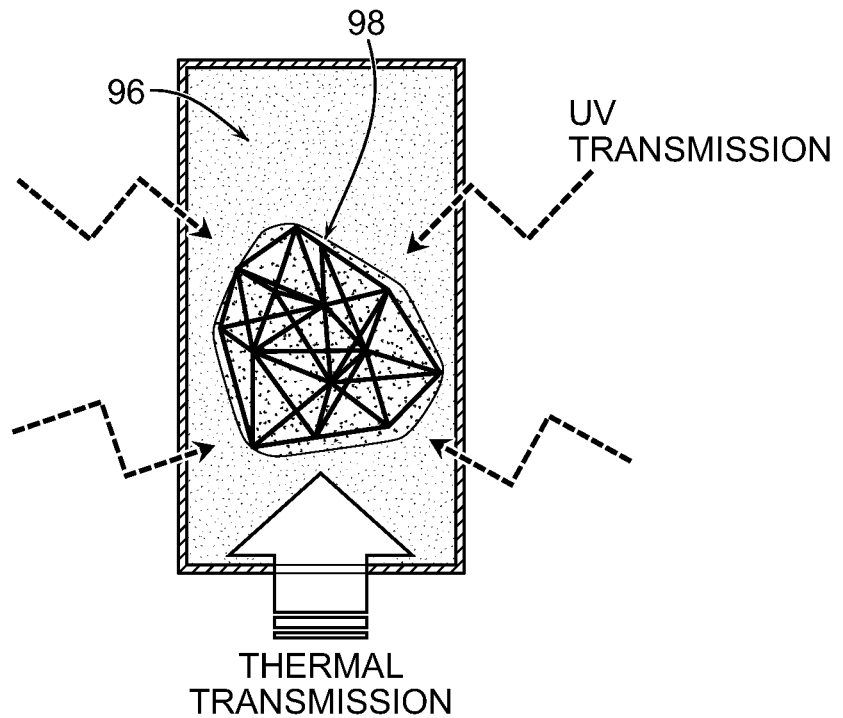
FIG. 9 is a schematic diagram illustrating a submersion fluid having a number of properties.

Alternatively, if desired, positive pressure can be applied to the 3-D construct 86 desirably filled with casting material 90 to shrink the size of internal bubbles (i.e. 60-100 psi are typical shrinking pressures), as shown in FIG. 8C. Note, positive pressure can be applied even if the filled part 92 remains submersed in casting material 90 with pressure applied to the submersed fluid 88. Pressure can be applied using standard techniques such as pressure compressors/pressure chambers, or in the case of submersion fluid 88, can also be applied hydraulically as with a piston mechanism FIG. 9 illustrate the submission fluid 96 can have a number of properties, not only to aid in part filling/casting material 98 retention, but in the control of the casting properties. For example, submersion fluid 96 can have thermal properties to allow cooling/heating and or radiative transmission properties such as UV light transmission to allow UV light curing or the like.

To facilitate curing of the casting material, the submersion fluid can have specific properties (i.e. permit radiative energy transfer such as ultraviolet wavelength light; UV for UV curing) and/or be held at specific properties, such as a desired temperature (i.e. thermal curing). To further support part fabrication, the submersion fluid may change in properties during the fabrication process—for example the fluid may be first held at one temperature to slow curing rate and facilitate part filling followed by change in temperature to facilitate curing once the part has been filled.

The density of the filler material can be similar to the density of the submersion fluid such that the effects of gravity on the filler material in the customized matrix are minimized.

Moreover, the density of the submersion fluid may be matched to the density of the curing fluid to minimize buoyancy/gravitational forces on the part during curing and promote stable retention of the casting material in the submerged 3-D construct. Such matching can be with the use of additives such as glycerol, urea, high-density aqueous liquids, or the like. It is recognized that another method of minimizing the gravitational forces on the filler material as it fills the matrix or aspect of the matrix is by filling in low gravitational environments—in the extreme, space as has been highlighted as a frontier for manufacturing for items needed in space/space stations. Certainly, implementation of this process requires sufficient infrastructure development. In these cases of density-matched submersion/casting materials, 3-D constructs can be reliably and slightly overfilled to make a smooth surface of desirable casting material around the part. Generally, these surfaces will be defined by interactions between the 3-D construct surface matrix, the casting material, degree of filling, and the submersion fluid.

Figure 10:
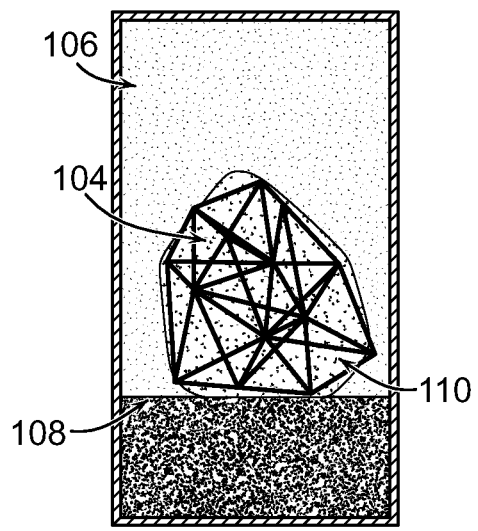
FIG. 10 is a schematic diagram illustrating a submersion fluid and base fluid having different properties.

FIG. 10 illustrates an embodiment where the casting material 110 fills the 3-D construct 104 during submersion in a submersion fluid 106, the submersion fluid 106 can have a particular property, such as density, hydrophobicity/hydrophilicity, such that it layers with/is partitioned from another base fluid 108. In cases of sequential filling of a matrix with multiple cycles of the same or different filler material, the object being filled may be submersed in different submersion fluids at different stages of filling to impart different properties to the filling process (such as different hydrophobicity/hydrophilicities, different densities, different conductivities, etc.)

The base fluid 108 can be established to allow a smooth interface for the casting to occur, for example where the base fluid 108 is a denser material than the submersion fluid, but still has a property, such as hydrophobicity/hydrophilicity that repels the 3-D construct 104 and casting material akin to (or even stronger than) the submersion fluid 106.

Figure 11:
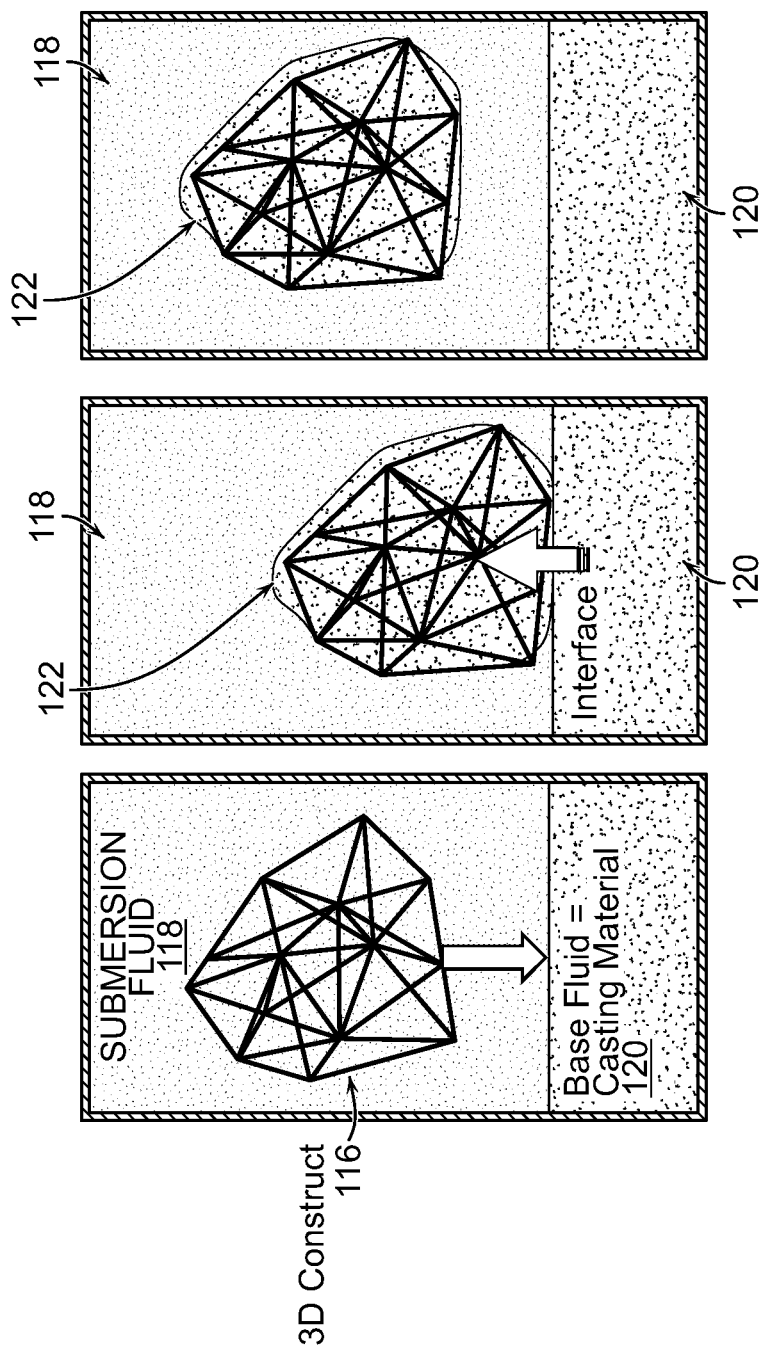
FIG. 11A-11C are schematic diagram illustrating the process of filling a 3-D construct where a casting material and base fluid having same properties.

FIG. 11A illustrates the base fluid 120 may itself be the casting material where in the 3-D printed construct 116 is brought into contact with the base material 120 where it is filled to form a customized part 122 by attractive forces, such as hydrophilicity or hydrophobicity, at the interface as shown in FIG. 11B, and then left in the submersion fluid 118 for curing, as shown in FIG. 11C. This process can occur by dipping the 3-D printed construct 116 through the submersion fluid 118 until it comes into contact with the base fluid 120 and is filled. In such cases the forces that cause the 3-D printed construct 116 to be filled are greater than the forces that cause resist the base fluid 120 from propagating in the direction of the submersion fluid 118.

Figure 12:
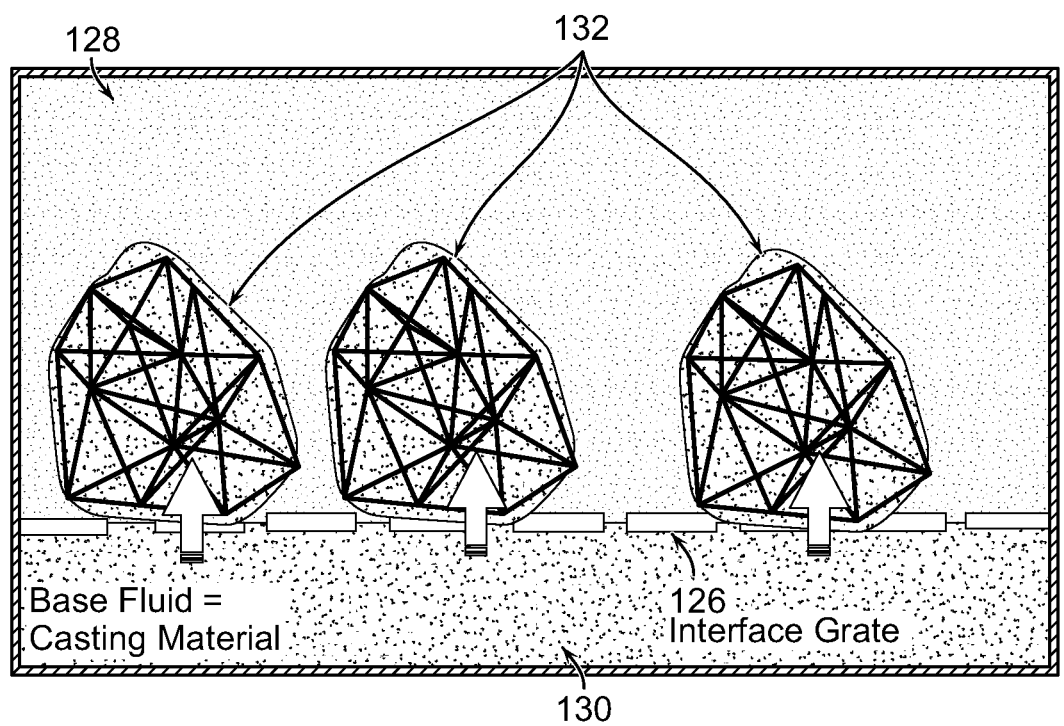
FIG. 12 is a schematic diagram illustrating the process of producing multiple parts in parallel.

FIG. 12 illustrates the process of producing multiple parts in parallel. A solid grating layer 126, such as a mesh, net, or fence, is placed at the interface of the submersion fluid 128 and base fluid 130 wherein the latter is also the casting material. This grating layer 126 can have similar properties, such as hydrophilicity, hydrophobicity, density, that help retain it at the interface. Such configurations can help retain separation/layering of submersion 128/base 130 fluid in a desirable arrangement, such as less dense materials below more dense materials to promote 3-D construct 132 filling through buoyancy forces.

In some cases, combined base fluid/submersion fluid properties can be arranged to promote such filling. For example, a less dense base fluid, which is the casting material, can actually be positioned below a denser submersion fluid (or vice versa). When a 3-D printed construct comes into contact with this surface, the casting/base material is drawn into the 3-D printed construct by attractive forces between the base/casting material and the 3-D printed construct, as well as, in this example, buoyancy forces between the base/casting material and submersion fluid.

The 3-D construct material can have the desired properties upon construction (3-D printing or assembly of premade geometric constructs). In other embodiments, the 3-D construct will have an additional preparatory step after initial printing in which it is treated to impart desirable surface properties (such as hydrophobicity/hydrophilicity) to facilitate filling with and retention of the casting material.

A 3-D construct is a matrix of interconnected volumes. Generally, the 3-D material volume can be less than the total material part volume with the casting material comprising the bulk of volume after filling with the casting material playing a major role in dictating final part properties. These properties may be any number of desirable material properties such as strength, rigidity, absorbability, diffusivity, conductivity, translucency/transparency, flexibility, weight/density, color, etc. In some cases, additives can be added to the filler material to promote a specific property, such as inclusion of carbon fibers, graphene, metallic powders, colorants, drugs (in drug delivery configurations). In some embodiments, the 3-D construct material, by itself, will be flexible to transmit forces to the casting material. In other embodiments, the 3-D construct material, by itself, will be brittle to allow cracking/shattering after part curing. Cracking may be mechanical or by some other means such as ultrasound (i.e. lithotripsy). In other scenarios, the construct may be degradable or meltable.

Figure 13B:
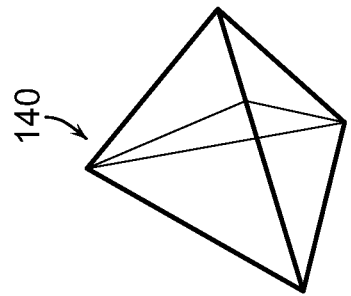
FIGS. 13A-13B are schematic diagrams illustrating customizable 3-D matrices that can be joined.
Figure 13A:
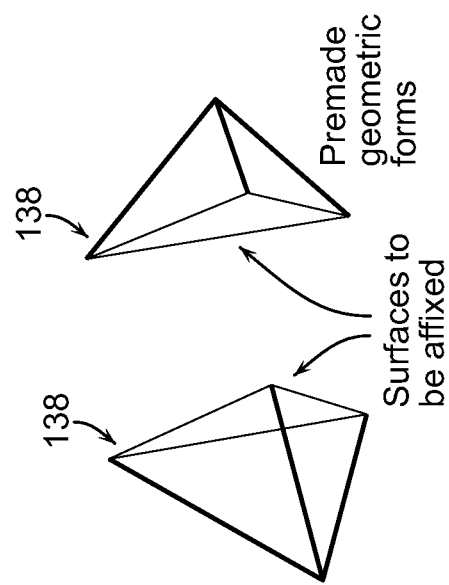

Customized matrices are formed in one of two ways: 1) 3-D printing; or 2) the assembly of preformed geometric forms (or sub-matrices) 138, as shown in FIG. 13A, through bonding, fusing, snap-fitting, as shown in FIG. 13B. In the case of 3-D printing, matrix design can be optimized for specified purposes through the use of algorithms that generate the matrix and direct the 3-D printing process. In the case of assembled preformed geometric forms, these forms can be designed to optimize filling with liquid filler material. In this later case, kits of preformed geometric forms can be used to create large variety of assemblies 140 (drawing on the notion of things such as Lego Blocks, but now in a form that can construct matrices that can readily by filled and cured with a liquid filler material to impart desirable material properties.

Filling can occur at the level of individual or modular sections of a desired larger structure, or at the end, after the entire structure has been assembled. Again, filling of each individual subcomponent can comprise a mosaic of desired materials, or an individual block can be comprised of a specific material that is physically combined with the other parts through the bonding/fusing/curing process, the other parts of which are comprised of different materials also creating a mosaic of materials.

Figure 14A:
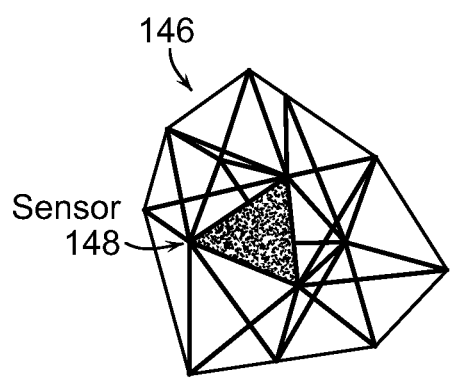
FIGS. 14A-14B are schematic diagrams illustrating sensors being built into a 3-D construct and embedded in preformed geometries assembled to form 3-D constructs.
Figure 14B:
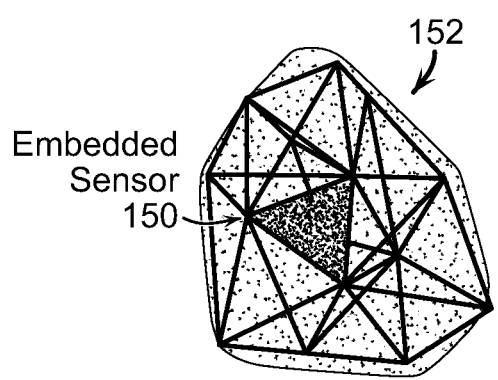

Prior to filling of a custom matrix 146 with filler material, sensors 148 of various kinds can be positioned within the matrix 146, as shown in FIG. 14A. In the case of premade geometric forms, sensors 150 can be built into at least a subset of the premade geometric forms such that they can be embedded into a custom matrix 152, as shown in FIG. 14B. Such embedded sensors can be used to monitor any number of signals within the parts, such as stress, strain, pressure, motion, vibration, acceleration, temperature.

The 3-D construct can be developed from irregular or regular elements. In cases of assemblies of premade geometric constructs, the elements can be different in shape, but are standardized to optimize filling, retention of liquid filler as well as assembly into desired 3-D constructs. It is generally noted that these premade geometries can be simple elements, or more complex elements, though still intended for assembly into larger constructs, after which they are filled and cured.

Figure 15B:
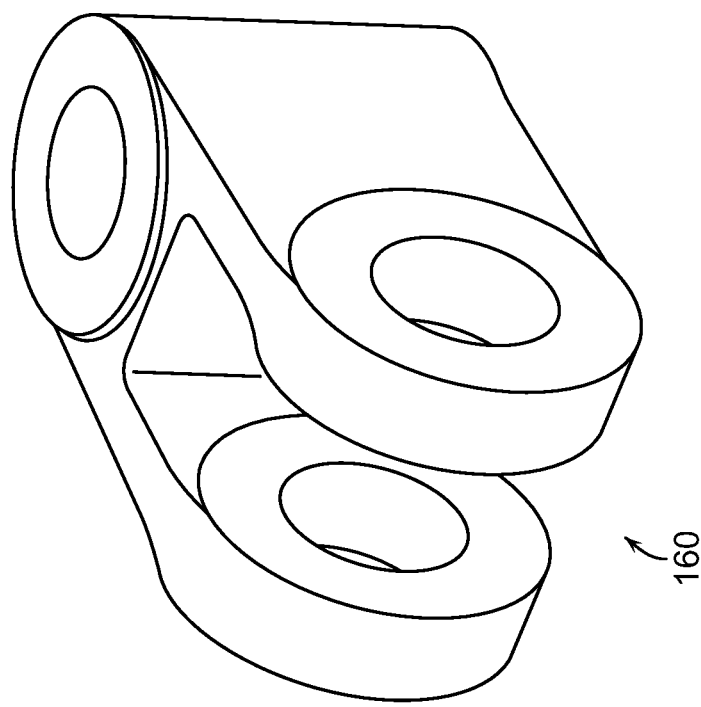
FIGS. 15A-15B are schematic diagram illustrating typical parts that have been designed and 'meshed' using a standard meshing algorithm.
Figure 15A:
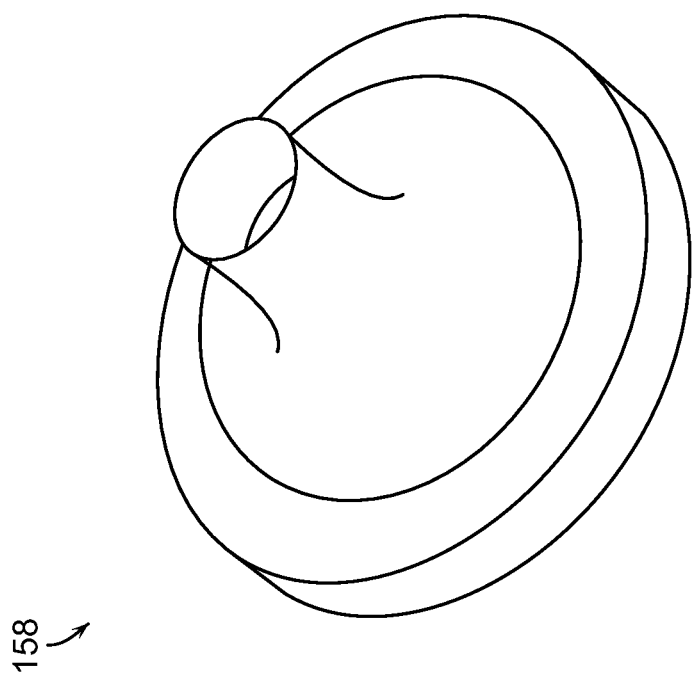

The 3-D printed construct 158 can be made up of elements that are designed from an algorithm that fills in/populates the desired fill volume with an optimal meshwork, as shown in FIG. 15A. The meshwork 160 can be made up of repeating elements such as rectangular boxes, tetrahedral elements, polyhedral elements, etc. as shown in FIG. 15B. Individual elements need not be exactly the same, but can be optimized for some purpose such as volumetric filling. Aspects of these elements can be discontinuous to reduce the mechanical stiffness of the elements. The exact nature of the elements (shape/size) may change throughout the part as determined by the optimization algorithm.

Aspects of the optimization algorithm can determine the method of filling the volume with mesh-work. Other aspects of the optimization algorithm can determine the method of ensuring the mesh has optimal properties to allow filling and retention of casting material in the presence or absence of submersion fluid. The algorithm can optimize the meshwork near the desired surface of the anticipated final part to ensure the surface is produced as anticipated. In general, such optimization algorithms exist, such as those that mesh volumes for computational simulations.

The applicability of these tools and methods enables a multitude of implementation strategies. For example, the custom matrices and filling with and casting of liquid filler material can all happen at a centralized location such as a facility dedicated to this type of customizable manufacturing, or any manufacturing plant wanting to engage in this type of manufacturing. Alternatively, the creation and filling of matrices can occur at a point of application, such as in a hospital, home, university, school, research center, government agency, military facility, etc., where a customized object is needed. As another option, customized matrices can be produced at a centralized location, and then shipped to a separate location, such as a point of application, where filling/curing with a desirable filling liquid occurs. Generally, as customized matrix composition and liquid filler material (and submersion fluid) characteristics can all be optimized together, a table/chart/algorithm can be made available for optimal selection for object creation.

Generally, it is envisioned that these processes will be scaled such that multiple parts can be produced at one time.

This invention is embodied in a number of configurations to make desired 3-D objects. As example, a mesh/lattice is 3-D printed in the geometry of a customized shoe sole. The printing (secondary structure; minimal mesh) is performed using fused deposition modeling (FDM) with a thermoplastic such as those available from STRATASYS like a polycarbonate (i.e, PC, PC-ABS, PC-ISO), an ABS (i.e. ABS, ABSplus, ABS-M30, ABS-ESD7, ABSi, ABS-M30i), or other material (i.e. FDM Nylon 12, PPSF/PPSU, Ultem 9085, ASA); or alternatively the 3-D mesh is produced through a process such as vat photopolymerization using a method like stereo lithographic apparatus (SLA) to polymerize a material such as 3-D Systems Accura ClearVue (or others materials such as Accura 25, Accura Xtreme, Accura ABS, Accura55, Accura60, AccuraCastPro, Accura 48HTR, Accura SL5530, Accura PEAK, Accura CeraMax, Accura BlueStone).

A number of other materials, resins, polymers, metals, etc. may also be considered. Other 3-D processes that can produce similar structures include DLP projection, two-photon polymerization, etc., or alternative 3-D printing means such as material jetting, binder jetting, powder bed fusion, sheet lamination, amongst others etc. After the hydrophobic 3-D printed matrix/lattice is formed, it is next submersed in water as a hydrophilic submersion fluid (note, the submersion fluid is generally prepared/tuned in some way as with additives such as glycerol, urea, heavy liquids, heteropolytungstates, and/or application of heat/light to alter properties such as density and curing temperature. After submersion, the hydrophobic 3-D matrix/lattice is filled with a hydrophobic filler/casting material such as a Smooth-On resin of similar density to as the submersion fluid reduce gravitational forces.

Casting resins such as Smooth-Cast 300 and Smooth-Cast 320 resin are used, as are a number of filler materials with desirable properties such as a specific color (Smooth-Cast Colormatch 325), high density (Smooth-Cast 380 tooling urethane), high rigidity (Smooth-Cast 385), semi-rigid of specific durometer (SmoothCast 45D, 60D, 61D, 65D, 66D), optically clarity (Smooth on Crystal Clear Series), tough impact resistance (Simpact 60A, 85A), light weight (Feather Lite), including others (Smooth-On Task 2, 3, 4, 5, 6, 7, 8, 9, 11, 12, 13, 14, 15, 16, 18, 21). A number of other curable resins/fillers are also used for particular applications, such as photopolymers from 3-D Systems such as the Accura series (Accura ClearView, Accura 25, Accura Xtreme, Accura ABS, Accura55, Accura60, AccuraCastPro, Accura 48HTR, Accura SL5530, Accura PEAK, Accura CeraMax, Accura BlueStone). When constructing a 3-D shoe sole, specific parts of the 3-D matrix are filled with a high impact material (i.e. the aspect in contact with the ground; i.e. Simpact 85A), while other parts of the sole are made from semi-rigid and lightweight materials (mosaic of SmoothCast 45D, 60D, 65D and Feather Lite; mosaic middle layer of the sole), while a customized hard insole designed by an orthopedist/podiatrist is formed from a hard, durable polymer (Smooth-Cast 380 or Smooth-Cast 385) to provide added arch support and injury protection.

Each aspect of the composite sole is in specific colors customized to the user's/customer's preference. Note that during filling the composite 3-D structure with different materials, the sole is typically transferred between different hydrophilic submersion fluids that are tuned to match the density of the specific filler material being filled through the use of specific aqueous additives (as described above). At the end of each filling stage, curing of filler material is accelerated by application of heat, though alternative means can be used depending on filler material used (i.e. UV light, laser, DLP, 2 photon curing).

In an embodiment of a 3-D assembly rather than 3-D printed process, a 3-D mesh/lattice subassembly part (i.e. a block) is pre-made in ABS (or alternative material such as PC, nylon, acrylic, lexan, styrene, metal, deirin, Teflon, polypropylene, polyvinylchloride, polyethelene, polyethylene terephthalate, polyurethanes, photopolymers such as the Accura line, etc.). The subassembly is submersed in tuned aqueous submersion fluid, filled with hydrophobic polymer of a specific property such as rigidity (as with Smooth-Cast 385). After curing, the subassemblies are then put together into a full assembly using fasteners, snaps, bonding agents, bolts, fusion (or some combination there in) where different parts of the assembly have desired properties which need not be the same (i.e. some aspects are flame-resistant using Task 7 to allow to come into contact with heat). In some desired embodiments the hydrophilic 3-D mesh/lattice subassemblies are fixed together into a final assembly prior to filling with filler/casting material and only after assembly, submersed and filled.

Although the present invention has been shown and described with respect to several preferred embodiments thereof, various changes, omissions and additions to the form and detail thereof, may be made therein, without departing from the spirit and scope of the invention.

What is claimed is:

1. A three-dimensional (3D) printing system that forms an object comprising:
   a submersion fluid located within an enclosed space;
   a customized matrix submersed in the submersion fluid and located within the enclosed space, the customized matrix configured to have material properties and geometric patterning to facilitate filling and retention of one or more filler materials, wherein the customized matrix defines the geometry and shape of the object; and
   a casting material configured to be introduced inside the customized matrix submersed in the submersion fluid, the casting material retained within the customized matrix configured to be cured or solidified to produce the object.

2. The 3D printing system of claim 1, wherein the customized matrix is hydrophobic and the submersion fluid is hydrophilic.

3. The 3D printing system of claim 1, wherein the customized matrix is hydrophilic and the submersion fluid is hydrophobic.

4. The 3D printing system of claim 1, wherein the submersion fluid is picked to have any one of, or a combination of, the following properties: a property that assists in filling and retention of the casting material, a property that targets a surface quality of casting material, a density of the submersion fluid that is picked to match that of the casting material, a viscosity of the submersion fluid that is picked to limit convective disturbances during filling and/or curing, a thermal property of the submersion fluid that permits cooling/heating to control curing of the casting material, a transmission property of the submersion fluid that permits radiative energy transfer to control curing, and an incompressible property to facilitate hydraulic pressure application.

5. The 3D printing system of claim 1, wherein the customized matrix is a 3D printed preform matrix.

6. The 3D printing system of claim 1, wherein the customized matrix is constructed from a set of premade geometric forms that can be affixed together to form the customized matrix.

7. The 3D printing system of claim 6, wherein one or more sensors are built into at least a subset within the set of premade geometric forms.

8. The 3D printing system of claim 1, wherein the submersion fluid comprises one or more properties to assist in the filling of the customized matrix by the casting material.

9. The 3D printing system of claim 1, wherein the submersion fluid comprises one or more properties to assist, retard, or influence curing of the casting material.

10. The 3D printing system of claim 9, wherein the one or more properties of the submersion fluid comprise heating, cooling, radiation/UV light transmittance.

11. The 3D printing system of claim 1, wherein the object comprises sensors positioned within the customized matrix prior to filling with and curing of casting material.

12. The 3D printing system of claim 1, wherein the density of the casting material is tuned to match the density of the submersion fluid to counteract the effects of gravity on the casting material in the customized matrix.

13. The 3D printing system of claim 1, wherein the viscosity of the casting material supports the filling of the customized matrix by the casting material by retarding convective forces arising within the submersion fluid.

\* \* \* \* \*